United States Patent
Jung

(10) Patent No.: US 11,354,184 B2
(45) Date of Patent: Jun. 7, 2022

(54) METHOD AND SYSTEM FOR PERFORMING AUTOMATED ROOT CAUSE ANALYSIS OF ANOMALY EVENTS IN HIGH-DIMENSIONAL SENSOR DATA

(71) Applicant: Palo Alto Research Center Incorporated, Palo Alto, CA (US)

(72) Inventor: Deokwoo Jung, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 448 days.

(21) Appl. No.: 16/448,273

(22) Filed: Jun. 21, 2019

(65) Prior Publication Data

US 2020/0401470 A1    Dec. 24, 2020

(51) Int. Cl.
   G06F 11/07    (2006.01)
   G06K 9/62    (2022.01)
   G06N 7/00    (2006.01)

(52) U.S. Cl.
   CPC .......... *G06F 11/079* (2013.01); *G06K 9/6224* (2013.01); *G06K 9/6277* (2013.01); *G06N 7/005* (2013.01)

(58) Field of Classification Search
   CPC ...... G06F 11/079; H04L 67/12; H04L 41/065; H04L 41/142
   See application file for complete search history.

(56) References Cited

U.S. PATENT DOCUMENTS

| | | | | |
|---|---|---|---|---|
| 9,497,071 | B2 * | 11/2016 | Gates | ................... G06F 11/079 |
| 11,044,533 | B1 * | 6/2021 | Li | ....................... H04L 41/0636 |
| 2012/0005532 | A1 * | 1/2012 | Li | ....................... G06F 11/0709 |
| | | | | 714/26 |
| 2015/0280969 | A1 | 10/2015 | Gates et al. | |
| 2018/0211171 | A1 | 7/2018 | Kirk | |

OTHER PUBLICATIONS

Sarah Nadi: "DRACA: Decision-support for Root Cause Analysis and Change Impact Analysis", Dec. 1, 2009, XP055611476, Retrieved from the Internet: URL:https://uwspace.uwaterloo.ca/bitstream/handle/10012/4889/NADI_SARAH.pdf [retrieved on Aug. 7, 2019] *abstract* *sections 1.1, 2.5, 3.4, 5.1, 5.2, 6.5*.

(Continued)

*Primary Examiner* — Nadeem Iqbal
(74) *Attorney, Agent, or Firm* — Shun Yao; Yao Legal Services, Inc.

(57) ABSTRACT

One embodiment of the present invention can provide a system for identifying a root cause of an anomaly event in operation of one or more machines is provided. During operation, the system can obtain sensor data from a set of sensors associated with the one or more machines, convert the sensor data into a set of sensor states, build an optimal DAG based on the set of sensor states to model causal dependency; determining, by using the DAG, a probability of an anomaly state of a target sensor given a state of a direct neighbor sensor, and determining a root cause of the anomaly event associated with the target sensor by back-tracking the anomaly state in the DAG.

17 Claims, 11 Drawing Sheets

(56) References Cited

OTHER PUBLICATIONS

Lee B H Ed—Institute of Electrical and Electronics Engineers: "Using bayes belief networks in industrial FMEA modeling and analysis", 2001 Proceedings of the Annual Reliability and Maintainability Symposium. The International Symposium on Product Quality and Integrity. Rams. Philadelphia, PA, Jan. 22-25, 2001; [Annual Reliability and Maintainability Symposium], New Yorkm NY: IEE, Jan. 22, 2001, pp. 7-15, XP010531028, DOI: 10.1109/RAMS.2001.902434.

Wu Zhenyu et al.: "An unsupervised degradation estimation framework for diagnostics and prognostics in cyber-physical system", 2018 IEEE 4th World Forum on Internet of Things (WF-IOT), IEEE, Feb. 5, 2018, pp. 784-789, XP033338429, DOI: 10.1109/WF-IOT.2018.8355191 [retrieved on May 4, 2018] *the whole document*.

\* cited by examiner

METHOD AND SYSTEM FOR PERFORMING AUTOMATED ROOT CAUSE ANALYSIS OF ANOMALY EVENTS IN HIGH-DIMENSIONAL SENSOR DATA

BACKGROUND

Field

This disclosure is generally related to a system and method for performing root cause analysis of anomaly events. More specifically, this disclosure is related to identifying a root cause of hidden anomaly events from high-dimensional sensor data.

Related Art

With the increasing use of Internet of Things (IoT) enabled equipments in numerous industrial applications, e.g., digital manufacturing, a large amount of sensor data is readily available. In many Cyber Physical System (CPS) applications, sensor data is continuously generated from IoT equipped devices. Such sensor data include actionable information that can be used to optimize operational efficiency of factory machines. In particular, optimizing operational efficiency and reducing risk of faulty events in the CPS have been one of the most pursued objectives for their immediate application to reduce factory downtime and improve productivity in manufacturing processes. However, when the dimensionality and the size of the sensor data grow, it quickly becomes a prohibitively expensive task to manually study and identify causal relationship among sensors to identify a root cause of an anomaly event during operation of machines in a factory layout.

To scale well to real-world applications, the root cause analysis workflow needs to be automated for discovering a causal relationship among sensors from the sensor data.

SUMMARY

According to one embodiment of the present invention, a system identifying a root cause of an anomaly in operation of one or more machines is provided. During operation, the system can obtain sensor data from a set of sensors associated with the machine, convert the sensor data into a set of sensor states for each sensor in the set of sensors, build an optimal Directed Acyclic Graph (DAG) among the set of sensors based on the set of sensor states to model casual dependency, determining a probability of an anomaly state of a user-defined target sensor given a state of a direct neighbor sensor, and determining a root cause of the anomaly state associated with the target sensor by backtracking the anomaly state in the graph structure.

In a variation on this embodiment, converting the sensor data into a set of sensor states for each sensor in the set of sensors comprises: applying a data pre-processing technique to the sensor data to time align the sensor data with a unified global reference time, wherein the unified global reference time includes a set of time intervals; and applying a data summarization technique to the pre-processed sensor data.

In a further variation on this embodiment, applying the data pre-processing technique further comprises: applying data interpolation techniques to the time aligned sensor data to replace missing sensor data samples.

In a further variation on this embodiment, applying the data summarization technique to the pre-processed sensor data comprises: applying a data transformation technique to generate a set of metrics for each time interval associated with the unified global reference time; and based on the set of metrics, grouping similar attributes, strongly connected components, in a set of attributes associated with the set of sensors by using a clustering technique to shrink each strongly connected component down to a single meta-node; and based on the set of meta-nodes, construct a meta-graph as a DAG of meta-nodes. A strongly connected component of a directed graph is a sub-graph that is strongly connected. The sub-graph in the directed graph can be strongly connected if each node in the sub-graph is reachable from every other node in the sub-graph. A group of similar attributes can be represented as the strongly connected component in the directed graph.

In a variation on this embodiment, building an optimal DAG structure among the set of meta-nodes based on the set of sensor states comprises: building a set of DAG structures based on a set of inputs and the set of sensor states; and searching for the optimal DAG structure from the set of graph structures by using a Bayesian network discovery technique.

In a further variation on this embodiment, the set of inputs includes one or more of: weather data, a user-specified black list, and a user-specified white list.

In a further variation, the set of sensor states are obtained by using a K-means algorithm.

In a variation of this embodiment, the DAG structure among the set of sensors comprises: a set of nodes, wherein each node in the graph structure represents a sensor in the set of sensor clusters (i.e. meta-nodes); and a set of directed edges, wherein each directed edge in the set of edges represents a casual dependency between two nodes in the graph structure.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In many real-world industry CPS applications, sensor data recorded during operation of one or more machines are large in number and often include heterogeneous types of sensors, which generate unreliable measurements. For example, in CPS applications, a Factory Energy Management System (FEMS) can receive data periodically from a large number of sensors associated with multiple factory substations, e.g., data from 600 sensors received every minute. The sensors can include: electric meters for measuring energy, current, voltage, etc., environment sensors for measuring temperature, humidity, $CO_2$, etc., and control state sensors for measuring air flow, cooling set point, etc. These sensors can be installed at various levels in a factory layout.

The recorded sensor data from the various sensors can include the following irregularities. First, the sensor data can include heterogeneous data having completely different formats and physical meanings. For example, heterogeneous data can include temperatures and power meter readings. With such heterogeneous data, it is challenging for a data processing system to seamlessly transform all variables with a unified framework for further processing in a root cause analysis workflow. Second, due to the instability of the communication channel between the sensors and a base station, the sensor data can be sparse and error-prone. Therefore, there is a need for a data processing system that is capable of tolerating all types of errors while producing reliable and accurate analytical results. Third, as a large number of sensors and other data sources in a CPS keep pushing updates to a data server, the data server gets flooded with these updates in a short time span. In order to cope with such a large amount of data, the data processing system can employ data summarization and compression techniques prior to performing any kind of analysis on the accumulated data in the data server.

Figure 1A:
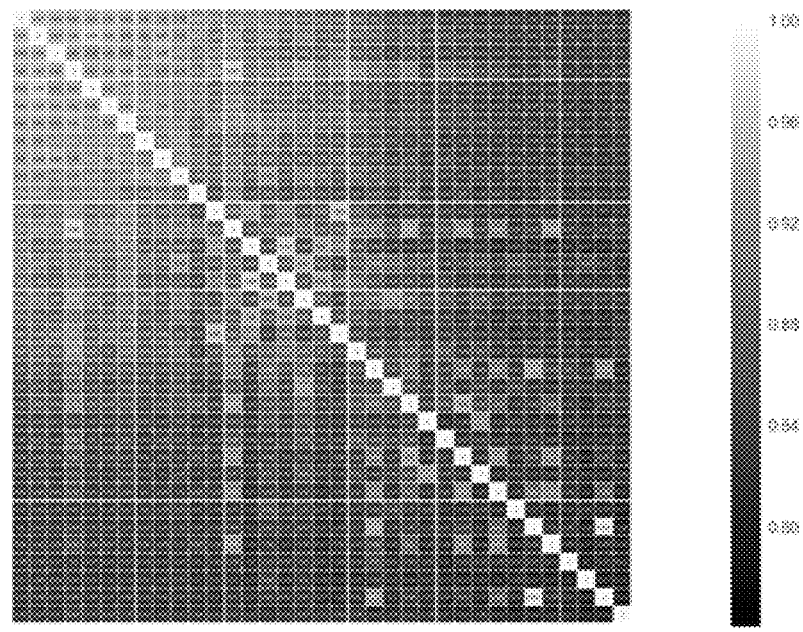
FIG. 1A shows an exemplary data correlation map, according to one embodiment of the present invention.

FIG. 1A shows an exemplary data correlation map, according to one embodiment of the present invention. The data correlation map is based on the data collected from a feeder from the FEMS. In FIG. 1A, lighter regions indicate higher correlations between two sensor measurements. Such correlations between a pair of sensor measurements could be due to their installation locations and types of the sensors. Furthermore, as the number of sensors to be analyzed grows, more number of sensors is likely to be correlated. The presence of such high correlation in the sensor data could incur unnecessary overhead in computation.

Figure 1B:
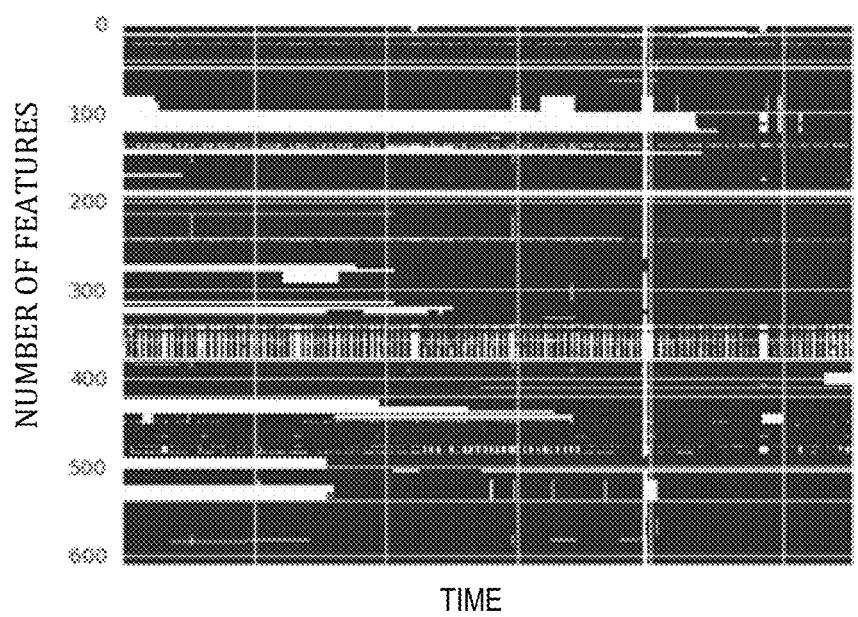
FIG. 1B shows an exemplary data quality map, according to one embodiment of the present invention.

FIG. 1B shows an exemplary data quality map, according to one embodiment of the present invention. Data quality can be defined as a ratio of normal data samples to the total number of data samples to be received given a unit time duration. In FIG. 1B, data quality is computed for a 1-hour time window, in which the dark regions indicate normal samples, while the lighter regions indicate correlated or random loss in sensor data.

Conventional automated root cause analysis methods do not take into consideration the inherent irregularities in the sensor data. In other words, they are based on the assumption of the quality, type and format of data, hence their automation capability is limited depending on the characteristics of datasets. The embodiments described herein solve the above-mentioned technical problems associated with performing automated root cause analysis of anomaly events in high-dimensional sensor data.

More specifically, a root cause analysis system can obtain sensor data and preprocess the sensor data to deal with irregularity in sampling rate and missed sensor readings. The system then selects only relevant sensor data for further processing. Specifically, the system transforms the pre-processed sensor data into a compact and informative data representation. Further, the system determines a set of sensor states for each sensor in the set of sensors. The system then strives to build an optimal DAG structure among the set of sensors cluster (i.e., meta-nodes) based on the set of states. By using the DAG structure, the system can determine a root cause of an anomaly event associated with a user-specified target sensor. Specifically, the system determines a probability of an anomaly state of the target sensor given a state of a direct neighbor sensor, then a root cause of the anomaly event in the target sensor is determined by back-tracking the anomaly state in the DAG structure.

The root cause analysis system described herein provides the following advantages: the system is dimensionally scalable as the system can scale well with the number of sensors available for analysis; the system is versatile as it can perform root cause analysis tasks for various forms of anomaly events using causality models learnt from weather, time, and sensor data; and the system is robust as it can perform analysis for corrupted, noisy, and lossy sensor data.

System Architecture

Figure 2:
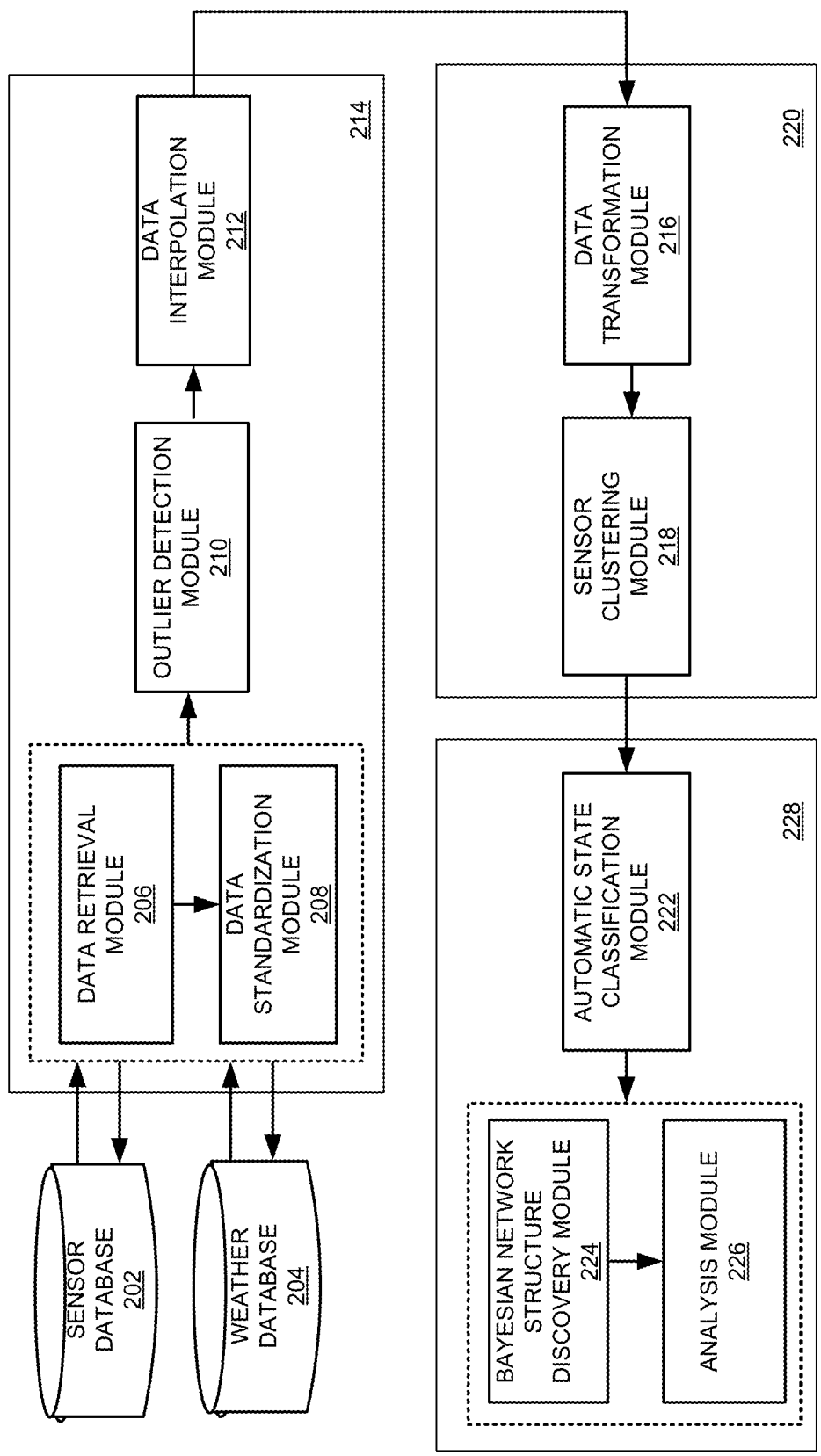
FIG. 2 shows an exemplary root cause analysis system architecture, according to one embodiment of the present invention.

FIG. 2 shows an exemplary root cause analysis system architecture, according to one embodiment of the present invention. A root cause analysis system 200 can include a sensor database 202, a weather database 204, and three processing stages. A first stage can include a data pre-processing module 214, a second stage can include a data summarization module 220, and a third stage can include a model discovery module 228. Data pre-processing module 214 can further include a data retrieval module 206, a data standardization module 208, an outlier detection module 210, and a data interpolation module 212. Data summarization module 220 can further include a data transformation module 216 and a sensor clustering module 218. Model discovery module 228 can further include an automatic state classification module 222, a Bayesian network structure discovery module 224, and an analysis module 226.

Sensor database 202 stores sensor data collected from a plurality of sensors embedded in one or more machines in a factory layout. The sensor data can be represented as a multivariate time series, e.g., the sensor data can contain records of a large group of variables at different timestamps. Weather database 204 is a publicly available database that can include data associated with the weather, e.g., temperature, dew point, humidity, etc. Data retrieval module 206 periodically queries sensor database 202 and weather database 204, and stores and/or updates corresponding data records that are kept in a binary data format in a local analysis server.

In one embodiment of the present invention, a user can set two timestamps, i.e., $T_s$ to $T_e$, indicating a time interval covering all observations. For example, the time interval could be set to one year. This time interval can be referred to as an analysis period. The analysis period can be represented as a pair of ($T_s$, $T_e$), and the system can automatically set the analysis period to support periodical update, unless explicitly specified by users.

In one embodiment, data standardization module 208 can assume that $T_s$ and $T_e$ are pre-defined and unchanged; and that all collected attributes associated with the plurality of sensors are ordered with an index $i \in \{1, \ldots, N\}$, where N represents a total number of attributes collected by data retrieval module 206 for analysis. The term "attributes" can also be referred to by an equivalent term "columns" in the database. Data standardization module 208 can divide all the collected attributes into two groups. A first group $S \subset \{1, \ldots, N\}$ includes attributes collected by the sensor database. A second group $W \subset \{1, \ldots, N\}$ contains weather-related attributes from the public database. Furthermore, data standardization module 208 can categorize the attributes in S into two classes. A first class can include a set of attribute indexes for primary sensors $S_P \subset S$ which are of interest for anomaly events, e.g., abnormal power consumption from power meter measurements. A second class can include the remaining sensor attributes, which is represented by $S_{/P}$ or $S-S_P$.

In one embodiment of the present invention, data standardization module 208 can improve efficiency of subsequent analysis of the sensor data by transforming all the retrieved sensor data samples in a time series based on the columns (or attributes) and can save the results in a column-store database system. Data standardization module 208 can construct a column vector for each $i^{th}$ attribute as $$a_i = (a_{i,j})_{j=1,\ldots,n_i},$$

where $n_i$ represents a total number of samples collected during the analysis period ($T_s$, $T_e$). Let $t_i=(t_{i,j})_{j=1,\ldots,n_i}$ denote a corresponding array of timestamps for $a_i$, where $T_s \leq t_{i,j} \leq T_e$ for $i \in \{1, \ldots, N\}$ and $j \in \{1, \ldots, n_i\}$.

Due to instability of a data communication channel between the sensors and a base station, the difference between two consecutive timestamps may not be a constant. In order to address any irregularity in sampling rates, data standardization module 208 can map all samples to a unified global reference time domain. Data standardization module 208 can partition the uniform global reference time into equal length intervals $\Delta$ in seconds, e.g., the length of the interval could be one hour.

Let $\tilde{t}_{k \in \{1, \ldots, K\}}$ denote a start time of a $k^{th}$ time interval, where K represents a total number of time intervals in the unified global reference time within the analysis period ($T_s$, $T_e$). The start time notation $\tilde{t}_k$ can be used for both the sensor attributes S and weather attributes W. A state of $\tilde{t}_k$ can be represented as time-related parameter representation triplet, i.e., $\theta^T = (\theta_m, \theta_d, \theta_h)$. In the triplet, $\theta_m$, $\theta_d$, and $\theta_h$ stand for month of the year, day of the week, and hour of the day, respectively. After data standardization module 208 has mapped all the timestamps to the unified global reference time intervals, it generates a new column vector for each attribute.

Outlier detection module 210 can classify each attribute into one of three general value types, i.e., continuous, discrete, and constant value. Outlier detection module 210 then analyzes patterns of the column vectors. If an attribute remains constant across all global reference time intervals, then these constant-type attributes may not be included for further analysis, as they may not generate any possible result in the root cause analysis workflow.

Data interpolation module 212 can aggregate all samples with timestamps within the time interval to calculate a mean and a variance associated with a specific attribute containing numerical values, so that there is at least one valid sample for the time interval. Otherwise, data interpolation module 212 can run an interpolation algorithm based on aggregation results of neighboring intervals. If the attribute contains categorical values, e.g., {high, median, low}, data interpolation module 212 can apply random hashing to map concrete values to an integer domain, and processes the attribute after mapping as continuous numerical values. For example, data interpolation module 212 can replace missed sensor readings by using linear interpolation for continuous values types, and nearest-neighbor interpolation for discrete value types.

The attributes associated with the sensor data and weather data available at the output of data interpolation module 212 can include diverse attribute types. In order to remove negative impacts of attribute type diversity and the large number of attributes, data summarization module 220 can transform the attributes into a compact and informative data representation. Data summarization module 220 can perform two different operations: data transformation (by data transformation module 216) and sensor clustering (by sensor clustering module 218).

In one embodiment, data transformation module 216 can summarize samples in each time interval into two distinctive features; an average feature and a variance feature for a regular event and an irregular event, respectively. Data transformation module 216 then constructs a feature matrix, where the time intervals and attributes are represented in rows and columns of the matrix respectively. The average feature can capture periodically occurring events, e.g., diurnal or weekly sinusoidal cycles. A periodically occurring event can be referred to as a regular event. The variance feature is capable of capturing non-periodically occurring events, which can also quantify fluctuations in attribute sample values. A non-periodically occurring event can be referred to as an irregular event.

For each time interval k, data transformation module 216 can compute the average and the variance feature for all attributes of the sensor data. Let $n_{i,k}$ denote the number of samples associated with attribute i during time interval k, and $s_{i,k}$ denote the sample index of attribute i in the beginning of the time interval k, i.e., $s_{i,k} = 1 + \Sigma_{r=1}^{k-1} n_{i,r}$. Then the average and the variance features are computed as follows:

$$\bar{a}_{i,k} = \frac{\sum_{j=s_{i,k}+1}^{s_{i,j}+n_{i,k}} a_{i,j}}{n_{i,k}} \quad (1)$$

-continued $$\dot{a}_{i,k} = \frac{\sum_{j=s_{i,k}+1}^{s_{i,j}+n_{i,k}-1} |a_{i,j+1} - a_{i,j}|}{n_{i,k} - 1} \quad (2)$$

where $\bar{a}_{i,k}$ and $\dot{a}_{i,k}$ denote the average and the variance feature of attribute i for time interval k.

Sensor clustering module 218 takes into consideration that sensor measurements are often highly correlated and that this high correlation can result in a rank-deficient feature matrix. Therefore, there is a need to select a finite number of representative attributes (i.e., column vectors of the feature matrix) within groups of similar attributes. Prior to grouping similar attributes, sensor clustering module 218 performs the following operations to eliminate effects of inconsistent units and scales of attribute features on the grouping/clustering. First, sensor clustering module 218 can normalize feature vectors (i.e., column vector of the feature matrix) of each attribute for a unit length and a zero center. Then sensor clustering module 218 can equivalently map each feature vector onto a surface of a unit K-dimensional sphere.

In one embodiment of the present invention, sensor clustering module 218 can use an affinity clustering algorithm. The affinity clustering algorithm can be used to group a set of most correlated attributes in such a way that each group of has a corresponding single representative attribute which can be referred to as an exemplar and the remaining attributes in the group can be referred to as a follower. For each exemplar, sensor clustering module 218 can construct two feature matrices, i.e., an average feature matrix and a variation feature matrix. Data processing operations performed in data sensor clustering module 218 can reduce a search space in model discovery module 228 by eliminating large number of correlated attributes. Furthermore, the affinity clustering algorithm provides a fast and reliable way for processing large data sets by constructing clusters via message passing and using distance metrics between data points.

In the following section, working of sensor clustering module 218 is described in further detail. In one embodiment of the present invention, sensor clustering module 218 can calculate the average and variance feature vector for attribute i according to equations (1) and (2) respectively. The average feature vector can be represented as $\bar{a}_{i.} = (\bar{a}_{i,1}, \ldots, \bar{a}_{i,K})$ and the variance feature vector can be represented as $\dot{a}_{i.} = (\dot{a}_{i,1}, \ldots, \dot{a}_{i,K})$. The average feature vector $\bar{a}_{i.}$ can be transformed into a zero-centered and unit length vector, denoted by $\bar{x}_{i.}$ such that $\bar{x}_{i.} = (\bar{a}_{i.} - \bar{\bar{a}}_{i.})/\|\bar{a}_{i.} - \bar{\bar{a}}_{i.}\|_{l_2}$, where $\bar{\bar{a}}_{i.} = \Sigma_k \bar{a}_{i,k}/K$. Similarly, the variance feature vector $\dot{a}_{i.}$ can also be transformed. Dissimilarity in the average feature between attribute i and j can be measured by the Euclidean distance as $d_{ij}^{avg} = |\bar{x}_{i.} - \bar{x}_{j.}|_{l_2}$. Similarly, dissimilarity in the variance feature vector $\dot{a}_{i.}$ can be measured and it is denoted as $d_{ij}^{var}$.

The dissimilarity measure in the average feature vector can also be defined as $d_{ij}^{avg} = \sqrt{2(1-\rho_{ij}^{avg})}$, where $\rho_{ij}^{avg}$ is the correlation coefficient of the average feature between attribute i and j. Further, the dissimilarity measure for the average feature vector is bounded by a set of real numbers $0 \leq d_{ij}^{avg} \leq 2$, and a similarity measure for the average feature vector can be defined as $s_{ij}^{avg} = 2 - d_{ij}^{avg}$. A similarity measure for the variance feature vector can be defined as $s_{ij}^{var} = 2 - d_{ij}^{var}$.

Then sensor clustering module 218 can determine zero-variance attributes for the average and variance feature vectors if the following conditions are satisfied:

$$\text{Var}(\bar{x}_{i.}) \leq \delta_{avg} \quad (3)$$

$$\text{Var}(\dot{x}_{i.}) \leq \delta_{var} \quad (4)$$

where $\text{Var}(\bar{x}_{i.})$ denotes a variance of the normalized average feature vector and $\text{Var}(\dot{x}_{i.})$ denotes a variance of the normalized variance feature vector, $\delta_{avg}$ and $\delta_{var}$ are the respective threshold values with $\delta_{avg} = \delta_{var} = 10^{-2}$. Let $C_{avg}^{zero}$ and $C_{var}^{zero}$ denote the groups (or clusters) of indexes of the zero-variance attributes for the average and variance feature vectors, respectively. In one embodiment, sensor clustering module 218 can use the affinity clustering algorithm to compute clusters of the average features and variance features. The affinity clustering algorithm uses the similarity measures $s_{ij}^{avg}$ and $s_{ij}^{var}$ for all non-zero-variance attributes $i,j \notin C_{avg}^{zero}$ and $i,j \notin C_{var}^{zero}$ respectively. The average and variance features of exemplar attributes can then be compactly represented by feature matrix $X^{avg} = [\bar{x}_{i.}]_{i \in C_{avg}^{exmp}}$ and $X^{var} = [\dot{x}_{i.}]_{i \in C_{var}^{exmp}}$ in which $C_{avg}^{exmp}$ and $C_{var}^{exmp}$ are attribute indices of exemplars for the average and variance features, respectively.

Figure 3A:
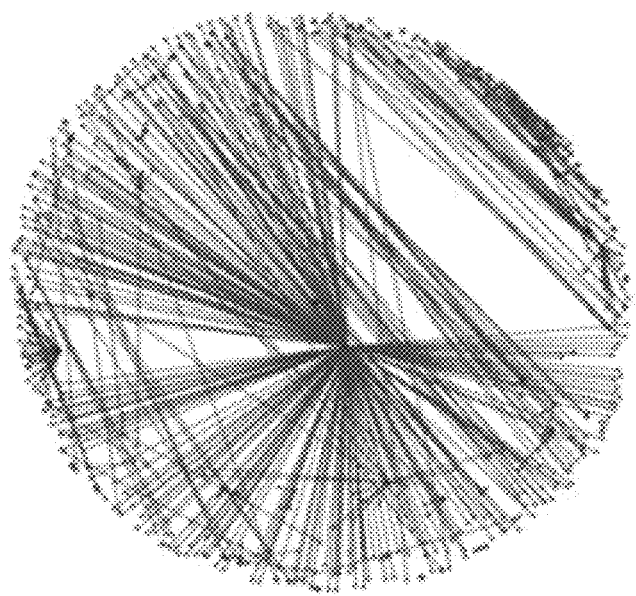
FIG. 3A shows a plot of clustering topologies for simulated regular events, in accordance with an embodiment of the present invention.
Figure 3B:
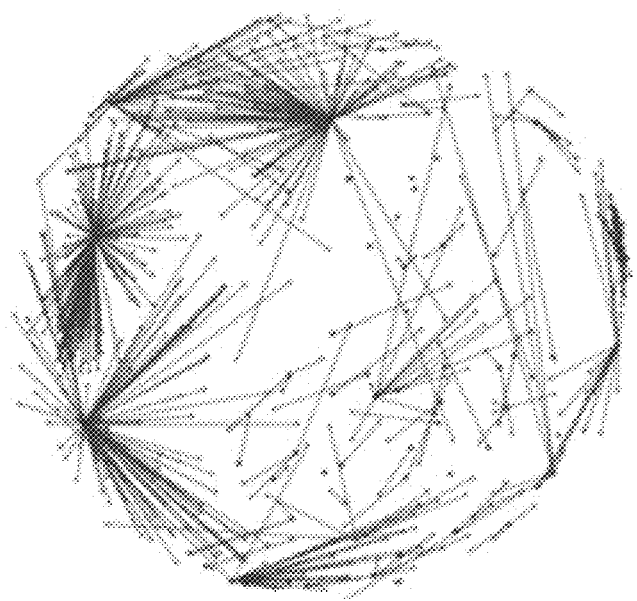
FIG. 3B shows a plot of clustering topologies for simulated irregular events, in accordance with an embodiment of the present invention.

FIG. 3A shows a plot of clustering topologies of exemplar and follower sensors for simulated regular events, in accordance with an embodiment of the present invention. FIG. 3B shows a plot of clustering topologies of exemplar and follower sensors for simulated irregular events, in accordance with an embodiment of the present invention. The topologies in FIG. 3A and FIG. 3B have been obtained by using the affinity clustering algorithm for simulated regular and irregular events.

Returning to FIG. 2, model discovery module 228 further processes data output by sensor clustering module 218 by using the following data processing modules: automatic state classification module 222, Bayesian network structure discovery module 224 and an analysis module 226. An objective of model discovery module 228 is to find a simple graphical representation of a causal dependency among attributes as DAG by searching for an optimal Bayesian Network (BN) structure given the observed sensor data and weather data.

Figure 4:
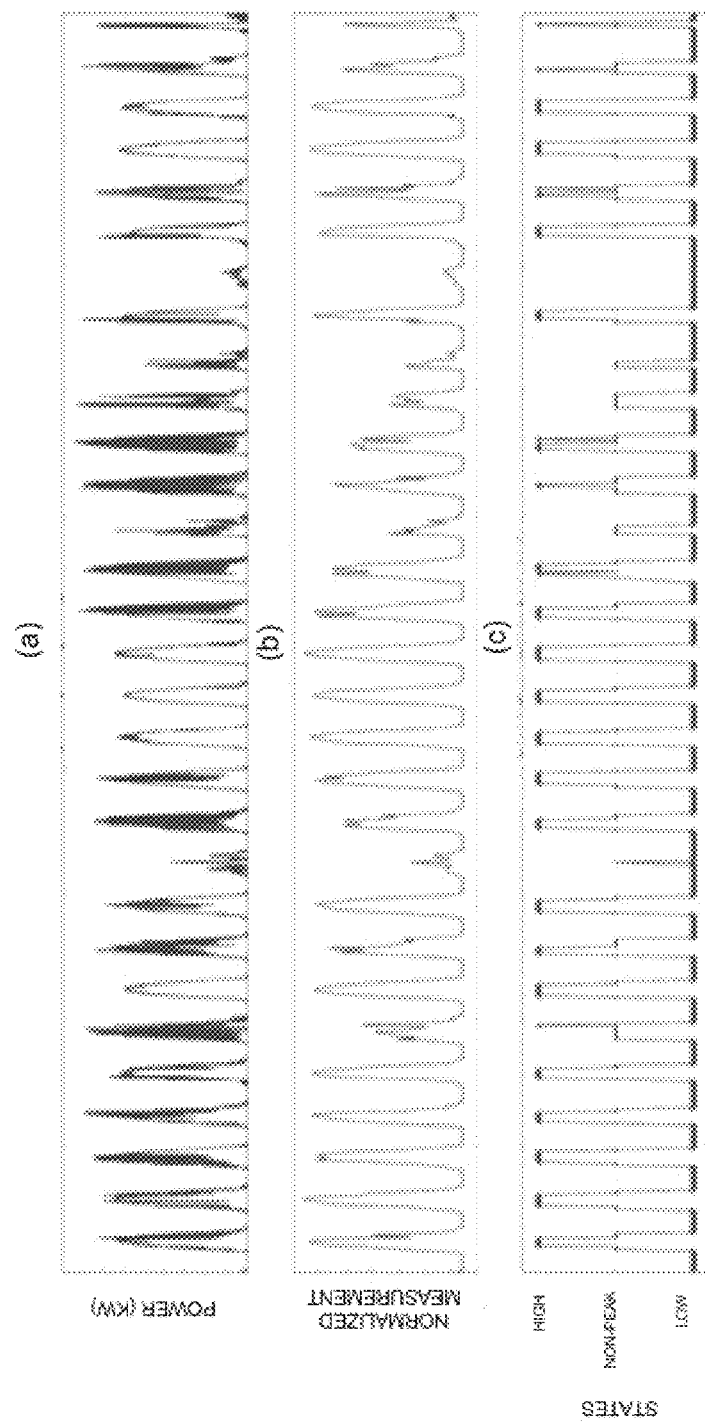
FIG. 4 shows an example of mapping simulated sensor data to ternary states based on hourly average data, according to one embodiment of the present invention.

Automatic state classification module 222 can use a K-means algorithm with knee-point detection where an optimal number of clusters K can be determined by the knee-point of trade-off between K and a log-likelihood of the model given K. Thereby, simplifying state configurations of a BN structure with regular events and irregular events represented by ternary states, e.g., high, low, and non-peak, and binary states, e.g., regular and irregular variations, respectively. FIG. 4 shows an example of mapping simulated sensor data to ternary states based on the hourly average of simulated sensor data, according to one embodiment of the present invention. Plot (a) in FIG. 4 shows an example of a power consumption profile of target sensor measurement, i.e., power meter data. This power meter data can be first transformed into a 15 min average, such an averaged power meter data is shown in plot (b). Then automatic state classification module 222 can transform the average power meter data to ternary states, e.g., high, low, and non-peak, (shown in plot (c)).

Table 1 (shown below) shows event classification of sensor measurements performed by automatic states classification module 222. Table 1 also provides a comparison between characteristics of the average and variation feature.

TABLE 1

Event classification of sensor measurements

| Event Type | Regular Event (Average Value) | Irregular Event (Differential Value) |
|---|---|---|
| Characteristic | Periodical | Non-Periodical |
| Time window | Set by users (default 15 min) | |
| Signal Feature | Sample Average | Total Variation |
| State | Ternary States | Binary States |
| Classification | (Low, High, or Non-Peak) | (Regular or Irregular variation) |
| Method | K-Mean with knee point detection | |

Returning to FIG. 2, Bayesian network structure discovery module 224 can then find a set of most probable graphical structures based on feature matrices with causal dependency among attributes represented as DAG by directed edges between nodes. Each of the graphical structures can include: a set of nodes with each node corresponding to attributes associated with a sensor; and a set of directed edges between nodes.

In the following section, working of Bayesian network structure discovery module 224 and analysis module 226 are described in further detail. Conventional systems need to explore an exponential search space for identifying the optimal BN structure without any constrains on the BN structures and states. Even if the conventional systems are capable of finding the optimal BN structure in a finite time, the resulting structure could be highly sensitive to an initial starting point and thus unreliable. Furthermore, if the states in the BN structure are not correctly defined, then an algorithm used for learning the BN structure may converge to a final solution with an indefinitely slow rate.

Figure 5:
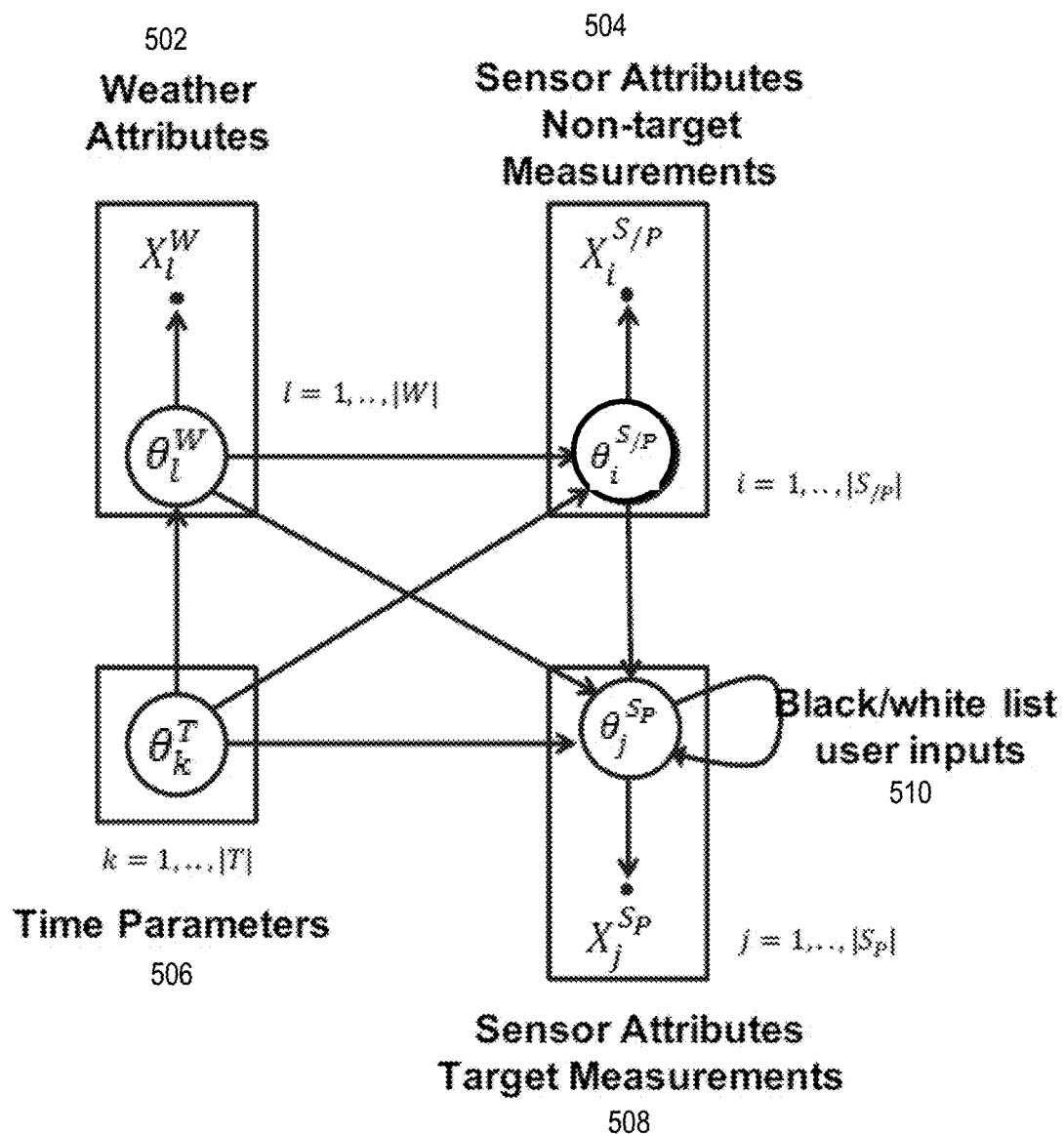
FIG. 5 shows an a DAG model structure prior data model, according to one embodiment of the present invention.

To overcome the above-mentioned problems, one embodiment of the present invention sets up a prior data model for BN structure to guide the search, FIG. 5 illustrates such a prior data model. FIG. 5 shows a DAG model structure prior data model, according to one embodiment of the present invention. The prior data model imposes fundamental constraints of causality among weather attributes 502, time parameters 506, and sensor attributes (that include target 508 and non-target sensor measurements 504) on the BN structure. Only one direction of causality is allowed, e.g., from time parameters 506 to weather attribute 502 but not from weather attribute 502 to time parameters 506. Such causality constraints can define a basic BN structure universally held for any kind of sensor and weather data. The system can represent the causality model by using individual attributes' hidden parameters learnt by automatic state classification module 222 in FIG. 2. In one embodiment, automatic state classification module 222 in FIG. 2 can find optimal discrete states, i.e., hidden parameters, for continuous states of attributes' feature, which can be equivalent to finding an optimal quantization of continuous states. The users can then provide black/white lists 510 based on their known dependence knowledge on sensors to further constraint the BN structures.

In one embodiment, notation X is used to denote both $X^{avg}$ and $X^{var}$. The notation $X_i$ denotes an $i^{th}$ column vector of X and represents observed feature samples of attribute i. A feature matrix for the target sensor measurement attribute can be denoted by $X^{Sp}$, and $X^{Sp}=(X_i)_{i\in Sp}$. In a similar manner $X^{S/p}$ and $X^W$ for non-target sensor measurement attributes 504 and weather attributes 502 can be defined, respectively. In one embodiment, observed feature samples $x_{i,k}$ can depend on an underlying or hidden discrete state $\theta_i$, i.e., $P(x_{i,k}|X,(\theta_j)_{j=1,...,N})=P(x_{i,k}|\theta_i)$. Alternatively, $\theta_i$ can be interpreted as a discrete state representation of continuous random variable $x_{j,k}$ after quantization. Notation $\theta^{Sp}$ denotes a hidden state of $X^{Sp}$, and $\theta^{S/p}$ denotes a hidden state for $X^{S/p}$, similarly the hidden states for weather and time attributes can be denoted by $\theta^W$ and $\theta^T$, respectively. The causal dependency among attributes can be compactly represented by a set of hidden parameters $\Theta=(\theta^{Sp}, \theta^{S/p}, \theta^W, \theta_T)$ by using a DAG shown in FIG. 5. In FIG. 5, an arrow between nodes represents a causal dependency, and each plate shows only a single example among nodes with the same attribute. No further assumption is made for dependency structures among nodes in a plate.

Returning to FIG. 2, Bayesian network structure discovery module 224 strives to find a compact probabilistic description of $\theta^{Sp}$ such that $P(\theta^{Sp}|\theta^{S/p}, \theta^W, \theta^T)$ given the graphical model in FIG. 5 and the feature matrix X. This objective can be achieved by adopting a BN framework that facilitates a systematic search for the best graphical structure for $\theta^{Sp}$ given X and the model in FIG. 5.

Let G=(N, E) denote a DAG with nodes N={$\theta_i\in\Theta$} and edges E representing direct dependencies between the variables. In addition, further variables can be defined as follows:

| Variables | Definition |
|---|---|
| $\Pi_{\theta_i}$ | A set of parents of $\theta_i$ in G |
| $D_{\Pi\theta_i}$ | A joint domain of the variables in $\Pi_{\theta_i}$ |
| $\theta_{ik}$ | $k^{th}$ value of $\theta_i$ |
| $w_{ij}$ | $j^{th}$ configuration of $\Pi_{\theta_i}$ |
| $z_{ijk}$ | $z_{ijk} = P(\theta_i = \theta_{ik} \| \Pi_{\theta_i} = w_{ij})$ |
| Z | $Z = \{z_{ijk}\}_{i\in 1...n, j\in D_{\Pi_{\theta_i}}, k\in D_i}$ |

An n-dimensional BN can be defined as a triplet $B=(\Theta, G, Z)$ and a unique joint probability distribution over $\Theta$ given by:

$$P_B(\theta_1, \ldots, \theta_n) = \Pi_{i=1}^n P_B(\theta_i|\Pi_{\theta_i}) \quad (5)$$

A set of all Bayesian networks with n variables can be denoted by $\mathcal{B}_n$. In one embodiment, Bayesian network structure discovery module 224 can learn a Bayesian network by searching for the Bayesian network $B\in\mathcal{B}_n$ that maximizes the value $\phi(B,\mathcal{D}_\Theta)$ where $\phi$ denotes a scoring function and $\mathcal{D}_\Theta$ denotes samples of hidden states $\theta$ found from X. In one embodiment, Bayesian network structure discovery module 224 can use a Greedy hill-climbing method to search $\mathcal{B}_n$ by a Bayesian Information Criterion (BIC) score.

Bayesian network structure discovery module 224 can use a Bayesian network framework to describe a dependency model for irregular events and regular events. Given the basic dependency model shown in FIG. 5, Bayesian network structure discovery module 224 can automatically learn a complete dependency structure (BN structure) for irregular and regular events. Then given the complete dependency structure, Bayesian network parameter estimation algorithms can be used to compute dependency probability (i.e., BN distribution) for regular and irregular events. In one embodiment of the present invention, Bayesian network structure discovery module 224 can learn BNs from the sensor measurements, weather data (e.g., temperature, dew point, humidity, events, and conditions), and timestamps (MONTH, WEEK, DAY, HOUR). In addition, the system can also enable users to manually provide inputs (e.g., blacklist and whitelist) to the learning model in FIG. 5.

Analysis module 226 then performs root cause analysis by successively computing the following dynamic equations in (6) until node i is a leaf nodes (i.e. a node without children)

$$\theta_{J_i}^k \leftarrow \operatorname*{argmax}_{\theta_{J_i}} P_B(\theta_i = \theta_{J_i}^k \mid \theta_{J_i}), \theta_{J_i}^0 \leftarrow \theta_t^* \qquad (6)$$

where $J_i$ denotes parent nodes of node i, $\theta_{J_i}$ denote a state of the node i's parent nodes and $\theta_t^*$ denotes the anomaly state of a target sensor.

Figure 6:
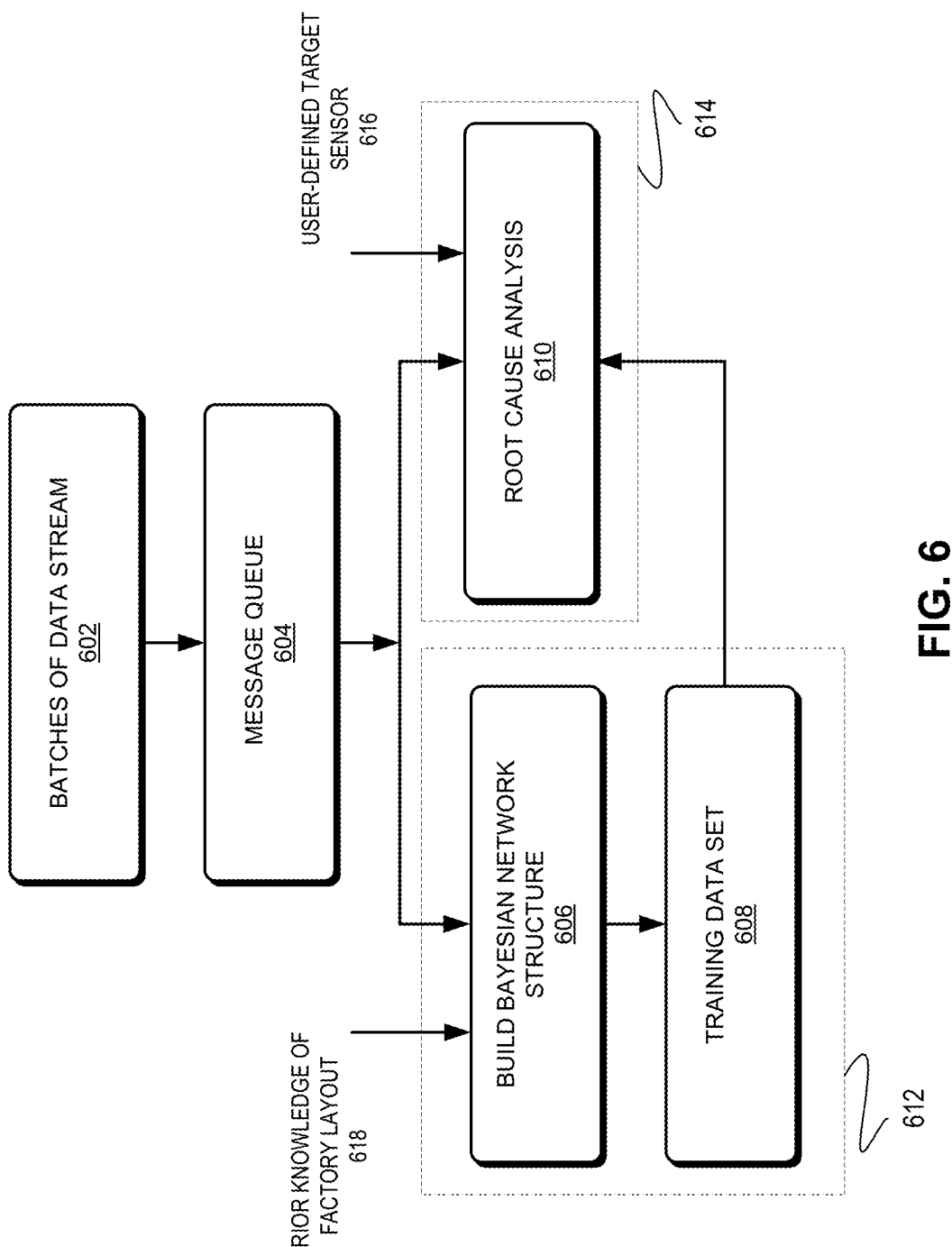
FIG. 6 shows an root cause analysis system design for the architecture in FIG. 2, according to one embodiment of the present invention.

FIG. 6 shows a root cause analysis system design for the architecture in FIG. 2, according to one embodiment of the present invention. FIG. 6 shows two independently running systems: system 612 for training and system 614 for inference. In one embodiment, training system 612 can learn a Bayesian network structure 606 from batches of data streams 602 from database servers and prior knowledge of factory layout 618. Inference system 614 can perform a root cause analysis task 610 using a most recent update of the Bayesian network structure available in training data set 608 and given a user-defined target sensor 616. A message queue 604 can appropriately control data streams among a database, training system 612 and inference system 614.

Figure 7A:
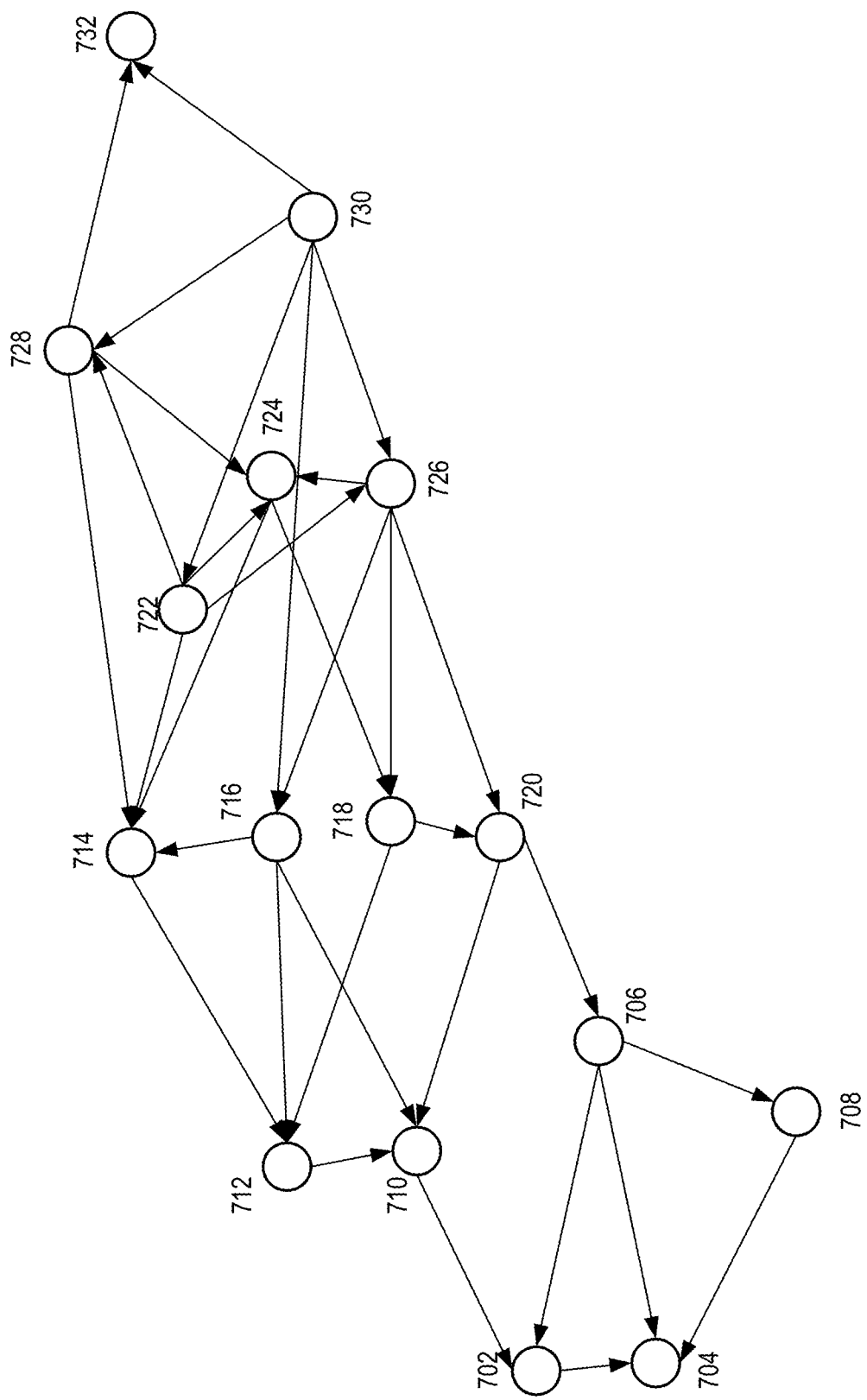
FIG. 7A shows an exemplary directed dependency graph, according to one embodiment of the present invention.
Figure 7B:
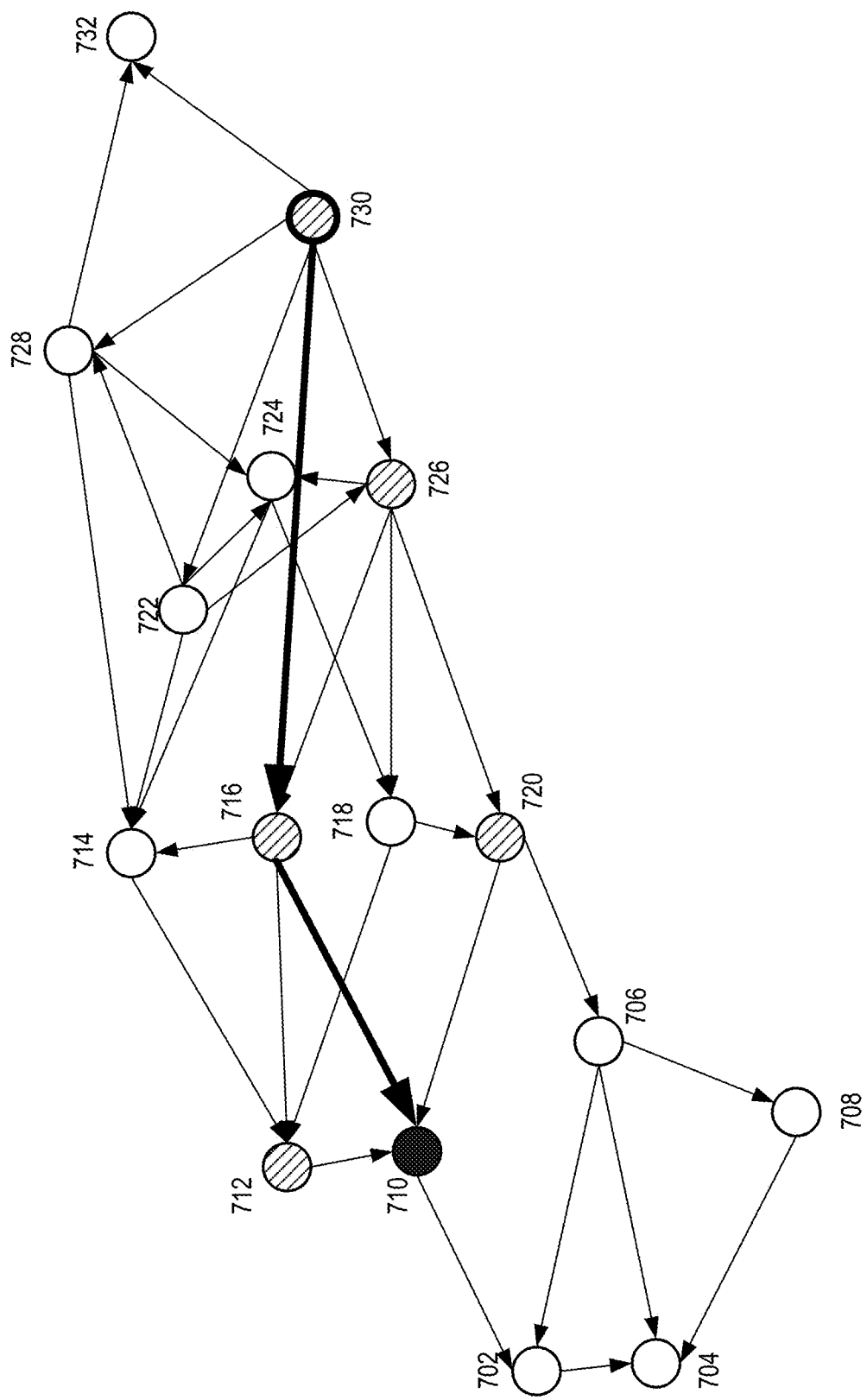
FIG. 7B shows an exemplary result of root cause analysis using a directed dependency graph, according to one embodiment of the present invention.

FIG. 7A shows an exemplary directed dependency graph, according to one embodiment of the present invention. The nodes 702-732 represent different sensors, while the directed edges connecting the nodes represent connections between the nodes. FIG. 7B shows an exemplary result of root cause analysis using a directed dependency graph, according to one embodiment of the invention. Given a target sensor 710 (black shaded circle), the system performs a root cause analysis using the directed dependency graph depicted in FIG. 7B. In one embodiment, the root cause analysis is computed by using equation (6). For example, if the abnormal state of the given target sensor 710 is set to "idle" state, then by using equation (6) the system can conclude that an "idle" state in sensor 710 occurs most likely due to the conditions existing in the following machines: when a machine associated with sensor 720 is also idle, when there are no inputs available at the input of a machine associated with sensor 716, and when a tact time of a machine associated with sensor 712 is longer than usual. And the most probable cause of anomaly is by sensor 716's "no input" state whose state's most probable cause is sensor 730' off state among sensor 716 and 730. Therefore, a root cause of the abnormal state in the given target sensor 710 can be traced back to the specific off condition of sensor 730.

Figure 8:
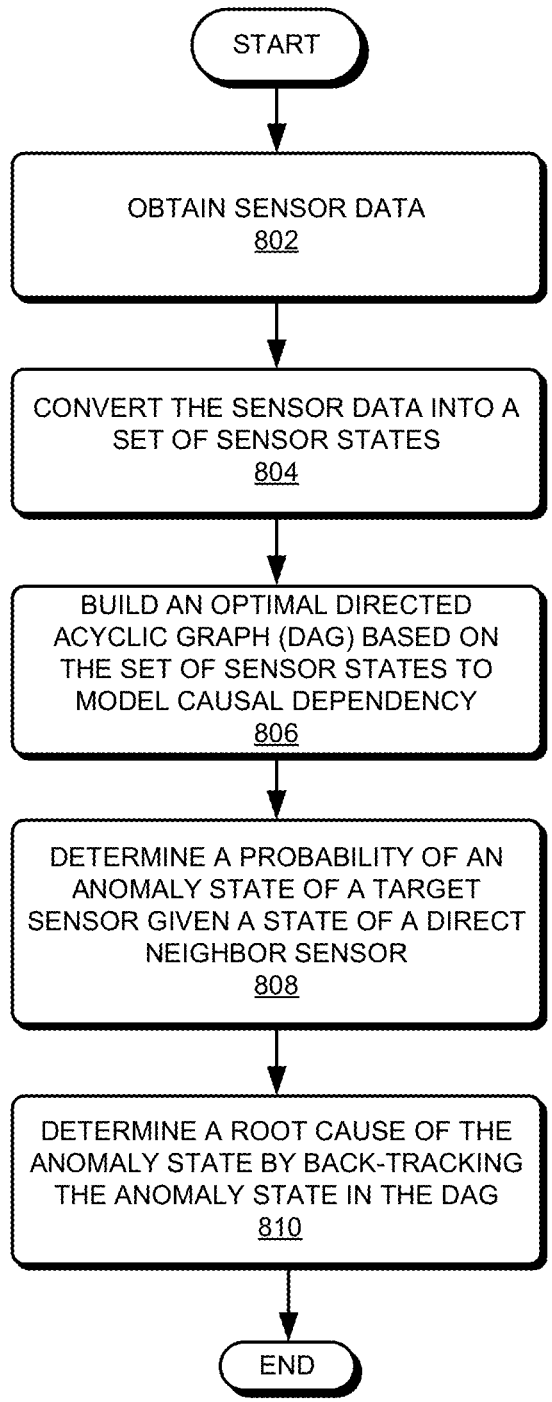
FIG. 8 presents a flowchart illustrating an exemplary process for performing root cause analysis of anomaly events, according to one embodiment of the present invention.

FIG. 8 presents a flowchart illustrating an exemplary process for performing root cause analysis of anomaly events, according to one embodiment of the present invention. During operation, the system may obtain sensor data stored in a sensor database (operation 802). The sensor data is associated with a plurality of sensors embedded in one or more machines in a factory layout.

In industrial IoT applications, due to the increasing number of sensors, the amount of sensor data collected can be large. Furthermore, the sensor data usually contain a large number of ill-conditioned data that include missing, corrupted, noisy, and highly correlate values. When such poor quality sensor data are used for performing root cause analysis, the results can be incorrect and hence unreliable. Furthermore, the computational complexity of root cause analysis can increase significantly due to the large number of sensor data. In order to provide a compact and informative representation of sensor data, the system converts the sensor data into a set of sensor states (operation 804).

Subsequent to operation 804, the system can build an optimal DAG structure by continuously learning BN structures by using the set of sensor states and selecting a most probable BN structure (operation 806). The system can then, determine for the optimal DAG structure, a probability for an anomaly state of a user-specified target sensor given the states of some of the direct neighbors in the graph (operation 808). The system can then determine a most probable cause of the anomaly state of the target sensor by back-tracing the anomaly state on the DAG (operation 810).

Exemplary Computer System and Apparatus

Figure 9:
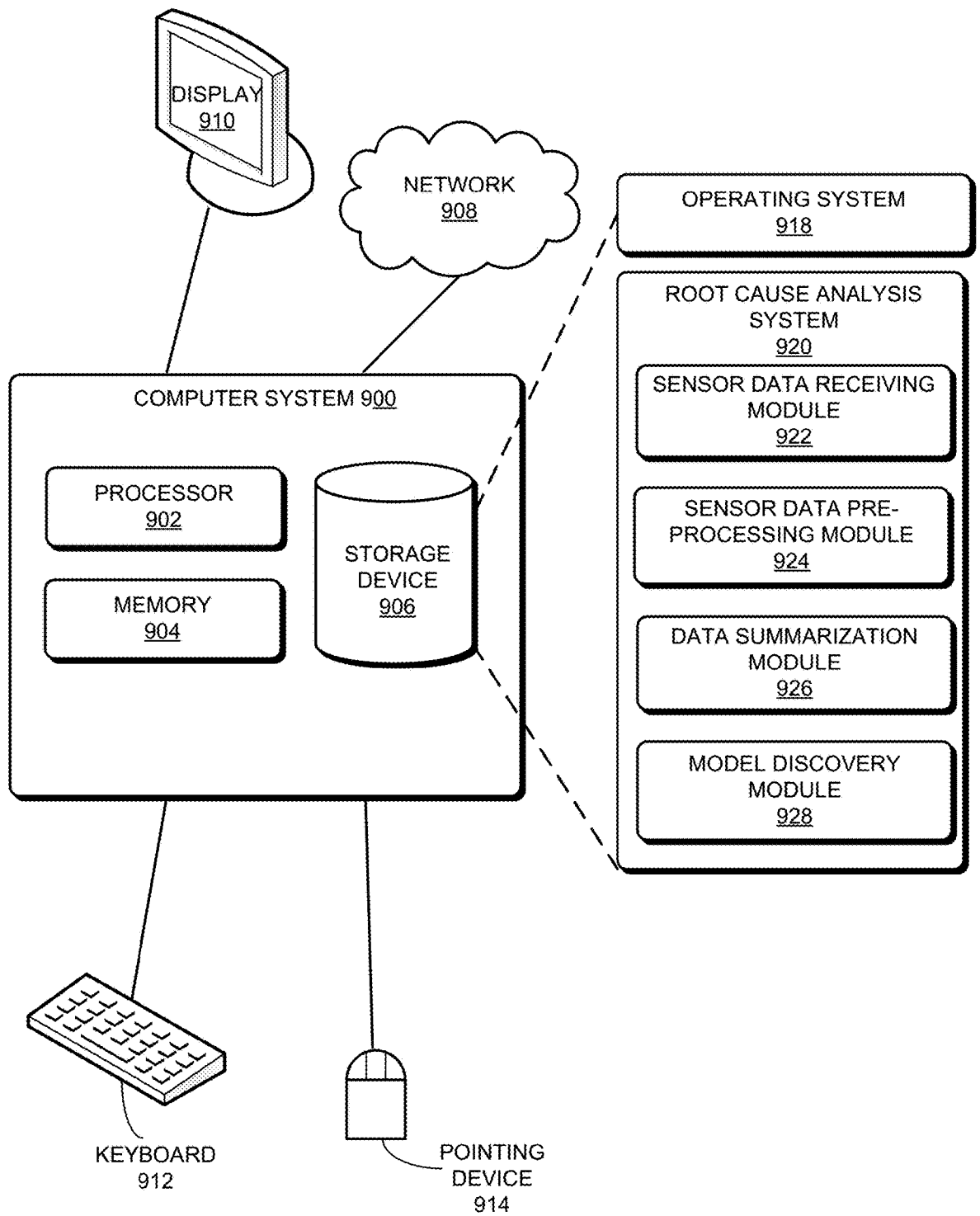
FIG. 9 illustrates an exemplary computer system that facilitates a root cause analysis system, according to one embodiment of the present invention.

FIG. 9 illustrates an exemplary computer system that facilitates a root cause analysis system, according to one embodiment of the present invention. Computer system 900 includes a processor 902, a memory 904, and a storage device 906. Computer system 900 can be coupled to a display device 910, a keyboard 912, and a pointing device 914, and can also be coupled via one or more network interfaces to network 908. Storage device 906 can store an operating system 918, and a root cause analysis system 920.

The root cause analysis system 920 can include instructions, which when executed by computer system 900 can cause computer system 900 to perform methods and/or processes described in this disclosure. The root cause analysis system 920 can also include instructions for receiving sensor data associated with the one or more sensors (sensor data receiving module 922), instructions for performing sensor data pre-processing (sensor data pre-processing module 924), and instructions for further processing the sensor data after the data pre-processing stage (data summarization module 926). Furthermore, root cause analysis system 920 can include instructions for finding a most probable graphical structure and for determining a root cause of an anomaly in a user-specified target sensor (model discovery module 928).

Figure 10:
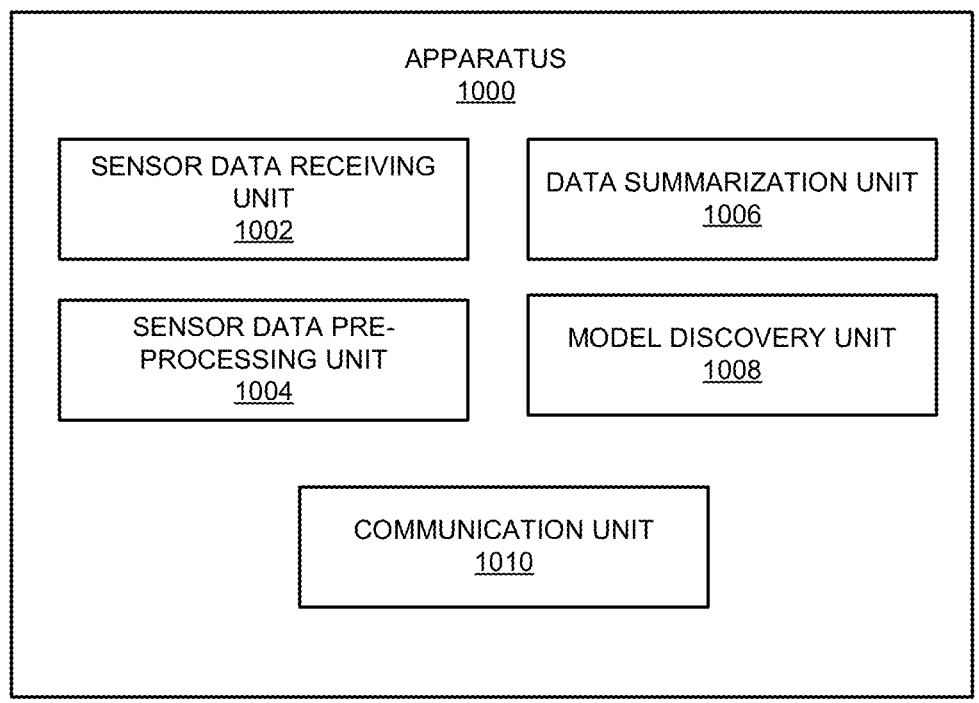
FIG. 10 illustrates an exemplary apparatus that facilitates a root cause analysis system, according to one embodiment of the present invention.

FIG. 10 illustrates an exemplary apparatus that facilitates an unsupervised anomaly-detection system, according to one embodiment of the present invention. Apparatus 1000 can comprise a plurality of units or apparatuses that may communicate with one another via a wired, wireless, quantum light, or electrical communication channel. Apparatus 1000 may be realized using one or more integrated circuits, and may include fewer or more units or apparatuses than those shown in FIG. 10. Further, apparatus 1000 may be integrated in a computer system, or realized as a separate device that is capable of communicating with other computer systems and/or devices. Specifically, apparatus 1000 can comprise units 1002-1010, which perform functions or operations similar to modules 920-928 of computer system 900 of FIG. 9, including: a sensor data receiving unit 1002, a sensor data pre-processing unit 1004, a data summarization unit 1006 and a model discovery unit 1008. Apparatus 1000 can further include a communication unit 1010.

In general, embodiments of the present invention provide a method and system to trace the root cause of an anomaly event for high-dimensional sensor data using DAG. Discovering the root cause of anomalies in factory machine operations using sensor data has been used as an example. In practice, this solution is not limited to detecting anomalies associated with factory machines. It can also be used to detect anomalies in other types of equipment or machinery.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for identifying a root cause of an anomaly in operation of one or more machines, the method comprising:
   obtaining sensor data from a set of sensors associated with the one or more machines;
   converting the sensor data into a set of sensor states;
   building an optimized Directed Acyclic Graph (DAG) for the set of sensors based on the set of sensor states to model causal dependency by:
      building a set of DAGs based on a set of inputs and the set of sensor states; and
      searching for the optimized DAG from the set of DAGs by using a Bayesian network discovery technique;
   determining, by using the DAG, a probability of an anomaly state of a target sensor based on a state of a direct neighbor sensor; and
   determining a root cause of the anomaly state associated with the target sensor by back-tracking the anomaly state in the DAG.

2. The method of claim 1, wherein converting the sensor data into a set of sensor states comprises:
   applying a data pre-processing technique to the sensor data to time align the sensor data with a unified global reference time, wherein the unified global reference time includes a set of time intervals; and
   applying a data summarization technique to the pre-processed sensor data.

3. The method of claim 2, wherein applying the data pre-processing technique further comprises:
   applying data interpolation techniques to the time aligned sensor data to replace missing sensor data samples.

4. The method of claim 2, wherein applying the data summarization technique to the pre-processed sensor data comprises:
   applying a data transformation technique to generate a set of metrics for each time interval associated with the unified global reference time; and
   based on the set of metrics, grouping similar attributes, strongly connected components, in a set of attributes associated with the set of sensors by using a clustering technique to shrink each strongly connected component down to a single meta-node; and
   based on a set of meta-nodes, constructing a meta-graph as a DAG of the meta-nodes.

5. The method of claim 1, wherein the set of inputs includes one or more of:
   weather data;
   a user-specified black list; and
   a user-specified white list.

6. The method of claim 1, wherein the set of sensor states are obtained by using a K-means algorithm.

7. The method of claim 1, wherein the DAG for the set of sensors comprises:
   a set of nodes, wherein each node in the graph represents a sensor in a set of sensor clusters; and
   a set of directed edges, wherein each directed edge in the set of edges represents a casual dependency between two nodes in the graph.

8. An apparatus for identifying a root cause of an anomaly in operation of one or more machines, comprising:
   one or more processors;
   a set of sensors embedded in the one or more machines; and
   memory storing instructions that, when executed by the one or more processors, cause the apparatus to:
      obtain sensor data from a set of sensors associated with the one or more machines;
      convert the sensor data into a set of sensor states;
      build an optimized Directed Acyclic Graph (DAG) for the set of sensors based on the set of sensor states to model causal dependency by:
         building a set of DAGs based on a set of inputs and the set of sensor states; and
         searching for the optimized DAG from the set of DAGs by using a Bayesian network discovery technique;
      determine, by using the DAG, a probability of an anomaly state of a target sensor based on a state of a direct neighbor sensor; and
      determine a root cause of the anomaly state associated with the target sensor by back-tracking the anomaly state in the DAG.

9. The apparatus of claim 8, wherein converting the sensor data into a set of sensor states comprises:
   applying a data pre-processing technique to the sensor data to time align the sensor data with a unified global reference time, wherein the unified global reference time includes a set of time intervals; and
   applying a data summarization technique to the pre-processed sensor data.

10. The apparatus of claim 9, wherein applying the data pre-processing technique further comprises:
    applying data interpolation techniques to the time aligned sensor data to replace missing sensor data samples.

11. The apparatus of claim 9, wherein applying the data summarization technique to the pre-processed sensor data comprises:
    applying a data transformation technique to generate a set of metrics for each time interval associated with the unified global reference time; and
    based on the set of metrics, grouping similar attributes, strongly connected components, in a set of attributes associated with the set of sensors by using a clustering technique to shrink each strongly connected component down to a single meta-node; and
    based on a set of meta-nodes, constructing a meta-graph as a DAG of the meta-nodes.

12. The apparatus of claim 8, wherein the set of inputs includes one or more of:

weather data;

a user-specified black list; and a user-specified white list.

13. The apparatus of claim 8, wherein the set of sensor states are obtained by using a K-means algorithm.

14. The apparatus of claim 8, wherein the DAG for the set of sensors comprises:
- a set of nodes, wherein each node in the graph represents a sensor in a set of sensor clusters; and
- a set of directed edges, wherein each directed edge in the set of edges represents a casual dependency between two nodes in the graph.

15. A non-transitory computer-readable storage medium storing instructions that when executed by a computer cause the computer to perform a method for identifying a root cause of an anomaly in operation of one or more machines, the method comprising:
- obtaining sensor data from a set of sensors associated with the one or more machines;
- converting the sensor data into a set of sensor states;
- building an optimized Directed Acyclic Graph (DAG) for the set of sensors based on the set of sensor states to model causal dependency by:
  - building a set of DAGs based on a set of inputs and the set of sensor states; and
  - searching for the optimized DAG from the set of DAGs by using a Bayesian network discovery technique;
- determining, by using the DAG, a probability of an anomaly state of a target sensor based on a state of a direct neighbor sensor; and
- determining a root cause of the anomaly state associated with the target sensor by back-tracking the anomaly state in the DAG.

16. The non-transitory computer-readable storage medium claim 15, wherein converting the sensor data into a set of sensor states comprises:
- applying a data pre-processing technique to the sensor data to time align the sensor data with a unified global reference time, wherein the unified global reference time includes a set of time intervals; and
- applying a data summarization technique to the pre-processed sensor data.

17. The non-transitory computer-readable storage medium claim 16, wherein applying the data summarization technique to the pre-processed sensor data comprises:
- applying a data transformation technique to generate a set of metrics for each time interval associated with the unified global reference time; and
- based on the set of metrics, grouping similar attributes, strongly connected components, in a set of attributes associated with the set of sensors by using a clustering technique to shrink each strongly connected component down to a single meta-node; and
- based on a set of meta-nodes, constructing a meta-graph as a DAG of the meta-nodes.

* * * * *